United States Patent [19]

Higgins et al.

[11] 4,096,282
[45] Jun. 20, 1978

[54] COLLAGEN COMPOSITIONS

[75] Inventors: Thomas Engel Higgins, Brookfield; Camilla Brems Ross, Hinsdale, both of Ill.

[73] Assignee: Union Carbide, New York, N.Y.

[21] Appl. No.: 756,248

[22] Filed: Jan. 3, 1977

[51] Int. Cl.² ............................................. A23C 13/00
[52] U.S. Cl. .................................. 426/140; 426/278; 426/646; 426/652
[58] Field of Search ............... 426/132, 135, 138, 140, 426/277, 278, 646, 652

[56] References Cited

U.S. PATENT DOCUMENTS

| 2,114,220 | 4/1938 | Freudenberg et al. | 426/278 |
|---|---|---|---|
| 3,123,482 | 3/1964 | Lieberman | 426/140 |
| 3,413,129 | 11/1968 | Lieberman | 426/140 |
| 3,446,633 | 5/1969 | Talty | 426/277 |
| 3,525,628 | 8/1970 | Cohly | 426/140 X |
| 3,551,535 | 12/1970 | Henderson et al. | 426/576 X |
| 3,627,542 | 12/1971 | Cohly et al. | 426/140 |
| 3,782,977 | 1/1974 | Henderson et al. | 426/140 |
| 3,894,132 | 7/1975 | Daniel | 426/140 X |
| 3,956,512 | 5/1976 | Higgins | 426/278 X |
| 4,021,522 | 5/1977 | Daniel | 426/140 X |

*Primary Examiner*—Joseph M. Golian
*Assistant Examiner*—R. A. Yoncoskie
*Attorney, Agent, or Firm*—David Fink

[57] ABSTRACT

Improved collagen compositions having incorporated therein relatively small amounts of propylene glycol alginate.

11 Claims, No Drawings

COLLAGEN COMPOSITIONS

The present invention relates to improved collagen food casings and to their preparation.

For a number of years thin-wall sausage casings have been prepared from processed animal collagen and, more recently, edible casings of collagen have been prepared and sold in commercial quantities. Commercially available edible collagen casings have proven to be a suitable replacement for natural casings in the preparation of food products, such as fresh pork sausages, wherein a meat emulsion of the pork sausage type is stuffed, linked and packaged without cooking, the encased sausage product then being suitable for cooking by the consumer without the need to remove the casing. Edible collagen casings have also been used for preparing sausage products, such as frankfurters, wherein the stuffed and linked food casings are cooked prior to packaging, but the highly automated processing techniques and wide variety of processing procedures that are employed have presented many difficulties and have limited the acceptance thereof.

The delicate, fragile nature of formed collagen structures, such as food casings, and problems encountered during the processing thereof are well known and methods of overcoming such problems have been the subject of a number of patents. A number of recent patents have also been directed to the preparation of edible collagen food casings that exhibit improved physical properties or that meet other special requirements for food casings, such as their performance during stuffing and cooking operations.

It is well known, for example, as disclosed in U.S. Pat. Nos. 3,123,482 and 3,413,129 to Lieberman, U.S. Pat. No. 3,446,633 to Talty, and U.S. Pat. No. 3,525,628 to Cohly, that collagen tubing prepared by extruding a fluid, low collagen solids mass involves processing by passing the tubing through a bath containing chemical hardening or tanning agents. Alternative methods, such as disclosed, for example, in U.S. Pat. Nos. 3,551,535 and 3,782,977 to Henderson et al., provide for the preparation of collagen tubing from collagen compositions containing collagen solids greater than 6% without the need for chemical hardening agents.

Whereas the casings prepared by treatment with tanning agents are generally quite strong and can be handled during processing, reeling, shirring, packaging, etc., in view of the difficulties encountered during the various processing operations, the development of a process for the production of collagen casing having satisfactory strength and handling characteristics without the need for subjecting the tubing to tanning agents would be desirable. Casings prepared by extruding high collagen solids compositions have been found to be strong enough to exhibit suitable handling and processing characteristics without the need for treatment with chemical hardening agents. It has been found, however, that casings which are shirred and packaged satisfactorily, and handle properly during stuffing, may have insufficient strength during cooking. The development of a process that would also eliminate or improve such characteristics would, therefore, be a desirable improvement.

It has been suggested in the past, as, for example, disclosed in U.S. Pat. Nos. 2,114,220 to Freudenberg et al, 3,446,633 to Talty and 3,551,535 to Henderson et al., that various materials may be incorporated in collagen compositions during their preparation to improve or modify the properties of the collagen structures prepared therefrom; and as disclosed, for example, in U.S. Pat. No. 3,627,542 to Cohly et al., that materials may be used to treat tubular collagen casings during the processing thereof to improve the casing cooking properties. Further, in U.S. Pat. No. 3,956,512 to T. E. Higgins, a process is described in which formable collagen compositions are prepared having certain types of fatty acid esters incorporated therein, the tubular food casing prepared therefrom exhibiting improved anti-block characteristics and improved casing cooking properties.

The need still exists for the development of even further improvements in the cooking and handling properties of collagen food casings, particularly when such improvements can be realized in simple manner without increasing the number or difficulty of processing steps for the preparation of the tubular food casing.

The present invention provides improved collagen compositions having incorporated therein relatively small amounts of a propylene glycol alginate. The incorporation of a relatively small amount of a propylene glycol alginate in collagen compositions surprisingly and unexpectedly results in shaped collagen structures such as, for example, tubular collagen food casings, that exhibit improved strength characteristics without the need for treatment with or addition of other chemical hardening or tanning agents.

The propylene glycol alginate is incorporated in the collagen compositions in accordance with this invention in an amount between about 0.2% and 5% by weight of the dry solids content of the collagen composition. The amount of the propylene glycol alginate employed is fairly critical to obtain the desired improvements. Use of the propylene glycol alginate in amounts substantially greater than about 5% have detrimental effects on the properties of the composition in use. Preferably, the propylene glycol alginate is employed in an amount corresponding to about 3% by weight of the dry solids content of the collagen composition. "Dry solids content" as used herein with respect to the collagen compositions and casings refers to the weight of all ingredients in such compositions and casings excluding water and glycerol.

The collagen can be prepared by any of the methods known in the art using collagen tissues obtained from a variety of raw materials as, for example, limed and unlimed animal hide splits and tendon.

Propylene glycol alginates, which are propylene glycol esters of alginic acid, are known materials available commercially in various viscosity grades. Thus, for example, various viscosity grades of propylene glycol alginates are available from the Kelco Company under the trade designation Kelcoloid, as well as from Alginate Industries, Ltd.

To obtain the collagen compositions of the present invention, the propylene glycol alginate is mixed with the swollen collagen, that is, after the collagen tissue has been swollen by treatment with a collagen swelling agent such as hydrochloric acid, but prior to forming desired shaped structures therefrom such as, for example, tubular food casings. In this manner, the propylene glycol alginate is incorporated and uniformly dispersed in the wall of the shaped collagen structure, eliminating the need for certain processing steps and for treatment with certain of the agents generally employed during the processing sequence for tubular collagen structures such as food casings.

In a preferred embodiment of the invention, collagen-containing tissue as, for example, limed animal hide splits, cleaned and prepared by methods well known in the art, are diced or coarsely chopped into pieces about ½ to 2 inches in size to facilitate transfer and agitation. After an additional treatment with lime and subsequent water wash, the hide pieces are subjected to treatment with a collagen swelling agent. Any of the known collagen swelling agents may be employed, but it is preferred to use dilute lactic, acetic or hydrochloric acid solutions. Collagen pieces are treated with swelling agent for an extended period of time, such as, for example, 4 to 9 hours or even longer, and, generally, until the character of the collagen material has completely changed from opaque to translucent. The swollen collagenous material is then washed with water to reduce the amount of residual acid and, generally, until the pH of the comminuted swollen collagen ranges between about 2.5–3.5. The swollen collagen is then drained, leaving pieces generally referred to as "acid-swollen chips."

As disclosed in U.S. Pat. No. 3,782,977 to Henderson et al., non-collagenous fibers that are to be incorporated into the collagen composition are first formed into a viscous aqueous fibrous dispersion that may contain between about 2 and 10% by weight of the non-collagenous fibers and between about 0.1 and 10% by weight of a viscosity control agent that is preferably water soluble or water dispersible. Suitable viscosity control agents include, for example, methyl cellulose, gelatin, starch, and particularly, a dispersion of swollen collagen particles. Non-collagenous fibers that may be employed are any of the non-shrinking and essentially inert fibrous additives known to be suitable in collagen compositions such as, for example, wood, cotton, rayon, other cellulosic fibers, non-cellulosic fibers such as polyester, polyamide and the like.

Acid-swollen chips to be used in the preparation of the formable collagen composition are, preferably, furthercomminuted prior to mixing with the aqueous fibrous dispersion. The acid-swollen chips may be partially subdivided by means known in the art, such as by coarse grinding or crushing, to prepare a mass containing a predominance of chunks having major dimensions of about ⅛ to ½ inch.

The propylene glycol alginate, water as water or ice, and a portion of the acid-swollen collagen chips are added to and thoroughly mixed with the viscous fibrous dispersion in a suitable dough mixer or other similar mixing equipment, and then the remainder of ground, acid-swollen chips are admixed therewith, whereby the fibrous additive and propylene glycol alginate components are uniformly distributed throughout the collagen mass in a relatively short time, as, for example, between about 2 and 10 minutes. Towards the end of the mixing step, the collagen mass becomes much more viscous, which helps in preventing separation of the various components during forming and subsequent processing thereof.

It is important that during grinding and mixing of the acid swollen chips, the temperature of the collagen mass be kept low and the temperature of the mass is, in general, maintained below about 25° C.

The collagen composition that is prepared preferably comprises at least about 6% by weight of collagen solids, and has uniformly incorporated therein between about 5 and 30% by weight of non-collagenous fibers based on the weight of total dry solids.

In alternative embodiments of the invention, the propylene glycol alginate can be added directly to the fibrous dispersion mixture before mixing the same with the ground acid swollen chips or it can be added to a swollen low collagen solids slurry prepared in accordance with any of the methods known in the art before or after adding other ingredients thereto.

The uniform high collagen solids composition so prepared is suitable, with only limited further processing, for forming into commercially acceptable formed or extruded collagen structures. A screw extruder or similar device can be used to transfer the collagen composition to homogenization equipment used in final preparation of the composition for extrusion.

Exemplary of a preferred method of preparing a tubular collagen structure such as, for example, a tubular food casing, a collagen composition of the invention is pumped and metered through an extrusion nozzle to form a continuous tube of collagen, which tube is strong enough to support itself in a tubular configuration with a low pressure inflation air while being conveyed to and through a predryer. The partially dried collagen tubing is then collapsed between nip rolls, neutralized by passing through a dip tank containing very dilute ammonium hydroxide, washed by passing through water tanks, and then plasticized by being conveyed through a dilute glycerine solution. The tubing is then reinflated with low pressure air, conveyed through a dryer while maintaining the tubular configuration, and then, if desired, shirred into a shirred casing stick by passing through a shirring apparatus.

Collagen tubing prepared from collagen compositions of the invention in the manner herein described perform satisfactorily through each of the various processing steps with, in general, no problems being encountered. Moreover, it has been found that tubular collagen casing prepared in accordance with the practice of the invention, performs very satisfactorily during stuffing, linking and cooking operations.

Tubular collagen food casings of the present invention have the propylene glycol alginate uniformly incorporated therein in an amount of at least about 0.1 up to about 3.0% by weight, and preferably between about 0.6 to about 1.9% by weight, of all components of said casing. Especially preferred are tubular collagen food casings having uniformly incorporated therein from about 3.0 to about 19.0% by weight of non-collagenous fibers based on the weight of all components of said casings.

The following examples are set forth as illustrating embodiments of the present invention and are not intended in any way to indicate the limits of the invention. Parts and percentages, unless otherwise indicated, are by weight.

EXAMPLE I

1630 Pounds of limed beef hide splits were chopped into approximately ½ to 2 inch pieces and subjected to an additional lime treatment by charging into a tank together with 57 pounds of lime and sufficient water to give a water to hide ratio of 3.9 to 1. The lime treatment was continued for 24 hours with intermittent agitation after which the limed hide chips were leached with approximately 10 gallons per minute of water for 20 hours. The hide chips were then swollen for 8 hours in a hydrochloric acid solution maintained at a pH of 1 using a flow rate of dilute acid of 10 gallons per minute. At the end of the acid swell treatment, the swollen chips were washed with water at 10 gallons per minute for about 5 hours until a wash water pH of 2.6 was reached. The chips were drained and chilled to about 1° C.

A cellulose fiber dispersion was prepared using the following ingredients:

| | |
|---|---|
| Collagen Composition (11.1% solids = 9.4% collagen solids and 1.7% cellulose fibers) | 254 pounds |
| Wood Cellulose Fibers | 155 pounds |
| Water | 2186 pounds |

The wood cellulose fibers used had an average fiber length of about 0.04 inch. Sheets of fibers were separated into convenient pieces, soaked in a portion of the water for about 60 minutes and then mixed for about two minutes, soaked for an additional 30 minutes, and then mixed for about 2 minutes. The rest of the ingredients were added to the mixer and the mixture was blended for about 165 minutes. The resulting wood cellulose fiber suspension was smooth, highly viscous, free of fiber clumps and had a composition of collagen solids 1%, wood cellulose fibers 5.6% and water 93.4%

A series of collagen compositions having a total solids of 11.1% were prepared. These compositions had total weights and solids ingredients as follows:

| | | Percent of Composition Solids | | |
|---|---|---|---|---|
| Collagen Composition | Composition Weight (lbs.) | Collagen | Cellulose Fiber | Propylene Glycol Alginate |
| A | 210 | 85 | 15 | 0 |
| B | 50 | 82 | 15 | 3 |
| C | 50 | 80 | 15 | 5 |

The collagen compositions were prepared by mixing weighed portions of 15.2% solids ground, acid-swollen chips, cellulose fiber dispersion, water and propylene glycol alginate.

Acid-swollen chips prepared as described above were ground in a meat grinder into pieces substantially between about ⅛ and ½ inch in size prior to blending with the viscous cellulose fiber dispersion. The temperature during grinding of the chips was controlled so as not to exceed about 20° C. The propylene glycol alginate used in this example was propylene glycol alginate LF/5, a product of Alginate Industries, Ltd. The propylene glycol alginate was dissolved in water as a 4.6% solution prior to mixing with the other ingredients of the collagen composition.

The propylene glycol alginate solution was mixed with the cellulose fiber dispersion. Water and ground acid-swollen chips were then added and the composition was mixed for about five minutes at which time the composition was homogeneous and began to adhere to the mixing equipment. The temperature of the various materials during the mixing step was controlled so as not to exceed 20° C.

After preparing the collagen compositions, they were fed through a rotary-shear homogenizer by means of a screw extruder and pump. To prevent degradation of the collagen, the homogenizer rotor and stator were cooled with a coolant maintained at a temperature of about −5° C.

After homogenization, the blend was pumped through two parallel filters with 0.003 inch slots to break up any remaining collagen lumps and remove any nondispersed matter.

The filtered collagen blends were pumped and metered through an extrusion nozzle to form a continuous tube of collagen. The extruded tubes were inflated with low-pressure inflation air while being conveyed on horizontal rolls.

The inflated collagen tubing was partially dried and hardened by passing through a predryer at 50° C., then collapsed between nip rolls, neutralized by passing through a dip tank containing 0.06 N ammonium hydroxide and washed by being conveyed through water tanks. After washing, the collapsed collagen tubing was conveyed through a solution of 4.5% glycerol in water.

The tubing samples were then reinflated with low pressure air, dried in air at 100° C., moisturized in an equalizer at 70% RH and then shirred by passing through a shirring apparatus. A small amount of edible oil was added to the casing as a lubricant during shirring.

After shirring, the casing was baked at 72° C. for 20 hours, cooled, humidified to 15% moisture by passing humid air through the casing, and packaged.

Propylene glycol alginate containing casings showed improved strength and processing compared to the control. The finished casings had the following composition:

| | Composition (% of Total Casing Weight) | | | | | |
|---|---|---|---|---|---|---|
| Collagen Composition | Propylene Glycol Alginate | Collagen | Glycerol | Water | Cellulose | Edible Oil |
| A | 0 | 53.8 | 18.4 | 15.0 | 9.5 | 3.3 |
| B | 1.9 | 51.9 | 18.4 | 15.0 | 9.5 | 3.3 |
| C | 3.2 | 50.6 | 18.4 | 15.0 | 9.5 | 3.3 |

Test results on the finished casings are shown in Table 1. Cooked strengths were increased and pressures required to unshirr the casing were reduced when propylene glycol alginate was present in the composition.

TABLE 1

Cooked burst pressures and unshirring pressures for propylene glycol alginate containing collagen sausage casings.

| Collagen Composition | Propylene Glycol alginate (% of Total casing weight) | Cooked burst pressure (mm of mercury) | Unshirring pressure (mm of mercury) |
|---|---|---|---|
| A | 0 | 64 | 22 |
| B | 1.9 | 77 | 16 |
| C | 3.2 | 73 | 12 |

Cooked burst pressures were increased for the propylene glycol alginate containing casings (Compositions B and C, Table 1) compared to the control casing (Composition A, Table 1). Cooked burst pressures were measured by soaking the casing in water, immersing the casing in boiling water for two minutes, cooling the casing, and then measuring the pressure in millimeters of mercury required to burst the casing.

Table 1 compares unshirring pressures for the casings of Example I. Pressures required to unshirr casings B and C containing propylene glycol alginate were reduced compared to casing A which contained no propylene glycol alginate. A low pressure required to unshirr casing can prevent breakage during stuffing of the sausage casing with meat emulsion. The unshirring pressure is measured by inflating a shirred stick of casing with air and measuring the pressure required to unfold the casing as it fills with air.

This example shows that propylene glycol alginate, when incorporated into collagen compositions at 3% and at 5% of dry solids content thereof, increases cooked strength and reduces pressures required to unshirr the casing.

EXAMPLE II

This example describes the use of propylene glycol alginate to strengthen collagen strands. Strength measurements on the resulting strands show that propylene glycol alginate strengthens shaped collagen articles when incorporated into collagen compositions in amounts up to about 5% of dry solids content. Collagen strands are prepared more readily than is collagen casing. The effect of different levels of propylene glycol alginate on the strength of a formed collagen article can be readily determined by making collagen strands.

1493 Pounds of limed beef hide splits were chopped into approximately 1⅞ to 2 inch pieces and subjected to an additional lime treatment by charging into a tank together with 105 pounds of lime and sufficient water to give a water to hide ratio of 4.4 to 1. The lime treatment was continued for 91 hours with intermittent agitation after which the limed hide chips were leached with 30 gallons per minute of water for eight hours and with 15 gallons per minute of water for 14 hours. The hide chips were than swollen for 9 hours in a hydrochloric acid solution maintained at a pH of 1 using a flow rate of dilute acid of 10 gallons per minute. At the end of the acid swell treatment, the swollen chips were washed with water at 30 gallons per minute for about 1.5 hours until a wash water pH of 2.6 was reached. The chips were allowed to equilibrate for 17 hours in the dilute acid solution, then drained and chilled to about 1° C.

A collagen fiber dispersion was prepared as described in Example I.

Collagen compositions having a total solids of 11.1% were prepared as described in Example I. Propylene glycol alginate was added as a 12.9 percent solution in water. The collagen compositions had solid ingredients as follows:

Propylene glycol alginate type KL3 is a high viscosity grade of propylene glycol alginate. Propylene glycol alginate LF5 is a low viscosity propylene glycol alginate. Both of these propylene glycol alginates were obtained from Alginate Industries Limited, London, England. Kelcoloid S is a low viscosity propylene glycol alginate obtained from Kelco Company, San Diego, California.

The collagen compositions were homogenized by pumping them through 1 millimeter diameter holes and then through three sets of 0.08 millimeter wide slots. The resulting homogenized collagen compositions were extruded through a 0.3 millimeter diameter orifice and then through a 2.2 millimeter diameter orifice into a neutralization bath containing 0.06 N ammonia.

The resulting collagen strands remained in the ammonia solution for 20 minutes at which time they were fully neutralized. The strands were then washed with water for twenty minutes and then plasticized in a 4.4% glycerol solution for 13 minutes. The strands were dried under a 5 gram tension at ambient temperature and baked for 20 hours at 72° C.

To minimize unavoidable variations among experimental samples, strands containing the same propylene glycol alginate and the respective control were prepared together. Strands containing Alginate Industries KL3 (Samples A through E) were prepared together. Likewise, strands containing Alginate Industries LF5 (Samples F through J) were prepared together as were strands containing Kelcoloid S (Samples K through O).

Table 2 shows the strength properties of the resulting strands. The strength measurements were made by draping a single cut collagen strand over a ⅜ inch diameter rod fastened to the pan of a direct reading balance. The strand ends were pulled downward. The balance reading at the time the strand broke was recorded. The values recorded in Table 2 are the average of five to 10 determinations.

| | | | Percent of Composition Solids | | |
|---|---|---|---|---|---|
| | Propylene Glycol Alginate | | Propylene Glycol | | Cellulose |
| Sample | Manufacturer | Type | Alginate | Collagen | Fiber |
| A | control for Samples B through E | | 0 | 85 | 15 |
| B | Alginate Industries | KL3 | 1.0 | 84 | 15 |
| C | Alginate Industries | KL3 | 5.0 | 80 | 15 |
| D | Alginate Industries | KL3 | 10.0 | 75 | 15 |
| E | Alginate Industries | KL3 | 20.0 | 65 | 15 |
| F | Control for Samples G through J | | 0 | 85 | 15 |
| G | Alginate Industries | LF5 | 1.0 | 84 | 15 |
| H | Alginate Industries | LF5 | 3.0 | 82 | 15 |
| I | Alginate Industries | LF5 | 5.0 | 80 | 15 |
| J | Alginate Industries | LF5 | 10.0 | 75 | 15 |
| K | Control for Samples L through O | | 0 | 85 | 15 |
| L | Kelco | Kelcoloid S | 1.0 | 84 | 15 |
| M | Kelco | Kelcoloid S | 5.0 | 80 | 15 |
| N | Kelco | Kelcoloid S | 10.0 | 75 | 15 |
| O | Kelco | Kelcoloid S | 20.0 | 65 | 15 |

TABLE 2

Strength Measurements of Collagen Strands Containing Propylene Glycol Alginate

| | | | | Strengths (grams) | | | |
|---|---|---|---|---|---|---|---|
| | | | | Before Baking | | After Baking | |
| | Propylene Glycol Alginates | | % of Composition Solids | Gel After Final Bath | Wet After Drying | Wet | Cooked |
| Sample | Manufacturer | Type | | | | | |
| A | Control for Samples B through E | | 0 | 231 | 359 | 445 | 241 |
| B | Alginate Industries | KL3 | 1.0 | 262 | 454 | 500 | 268 |
| C | Alginate Industries | KL3 | 5.0 | 275 | 430 | 462 | 334 |
| D | Alginate Industries | KL3 | 10.0 | 140 | 267 | 334 | 280 |
| E | Alginate Industries | KL3 | 20.0 | Strands too weak to be processed | | | |
| F | Control for Samples G through J | | 0 | 202 | 408 | 491 | 315 |
| G | Alginate Industries | LF5 | 1.0 | 244 | 452 | 528 | 337 |
| H | Alginate Industries | LF5 | 3.0 | 257 | 438 | 622 | 374 |
| I | Alginate Industries | LF5 | 5.0 | 215 | 419 | 578 | 344 |

TABLE 2-continued
Strength Measurements of Collagen Strands Containing Propylene Glycol Alginate

| Sample | Propylene Glycol Alginates | | % of Composition Solids | Strengths (grams) | | | |
|---|---|---|---|---|---|---|---|
| | | | | Before Baking | | After Baking | |
| | Manufacturer | Type | | Gel After Final Bath | Wet After Drying | Wet | Cooked |
| J | Alginate Industries | LF5 | 10.0 | 185 | 356 | 506 | 312 |
| K | Control for Samples L through O | | 0 | 224 | 515 | 542 | 284 |
| L | Kelco | Kelcoloid S | 1.0 | 250 | 573 | 615 | 349 |
| M | Kelco | Kelcoloid S | 5.0 | 222 | 547 | 619 | 357 |
| N | Kelco | Kelcoloid S | 10.0 | 173 | 442 | 491 | 345 |
| O | Kelco | Kelcoloid S | 20.0 | 92 | 302 | 368 | 242 |

Gel strength measurements were made on the wet, plasticized strands immediately after treatment in the glycerol bath. Wet strengths were measured after soaking the strands in water for 10 minutes prior to the measurement. Wet strengths were measured on strands prior to baking and on strands after baking. Cooked strengths were measured on baked strands after soaking the strands in water for 10 minutes, immersing them in boiling water for 2 minutes, and cooking them in cold tap water.

The strength measurements show that 1, 3 and 5% propylene glycol alginate increase the strength of collagen strands. Thus, Samples B, C, G, H, I and L containing 1, 3 and 5% propylene glycol alginate had higher gel strengths, higher wet strengths and higher cooked strengths than did Samples A, F and K, the respective control samples containing no propylene glycol alginate. Sample M containing 5% propylene glycol alginate had a gel strength slightly lower than its control, Sample K, but other strengths were higher than the control.

The strength measurements show that 20% propylene glycol alginate weakened the collagen strands. Thus, Sample O, containing 20% propylene glycol alginate, had a lower gel strength, a lower wet strength and a lower cooked strength than did Sample K, the control sample containing no propylene glycol alginate. Sample E, containing 20% propylene glycol alginate, gave strands too weak to be processed.

The strength measurements also show that on balance 10% propylene glycol alginate also weakened the collagen strands. Thus, Samples D and N, containing 10% propylene glycol alginate, had lower gel strengths and lower wet strengths than did Samples A and O, the respective controls. Samples D and N had higher cooked strength than did their control, Sample J, containing 10% propylene glycol alginate, had a lower gel strength and a lower wet strength before baking than did Sample F, the control. Sample J also had a lower cooked strength than did Sample F, the control. Sample J had a higher wet strength after baking than did Sample F.

This example shows that propylene glycol alginate, when incorporated into collagen compositions in amounts of 5% and below of dry solids, strengthens shaped collagen articles.

In producing the collagen composition of the present invention, any other ingredient well known to those skilled in the art which can be utilized to impart a particular characteristic or property to collagen structures obtained therefrom may also be present, if desired. Moreover, the collagen compositions of the invention may be shaped or formed into any of a wide variety of desired structures.

Those modifications and equivalents which fall within the spirit of the invention are to be considered a part thereof.

What is claimed is:

1. A homogeneous formable acidic collagen composition having uniformly incorporated therein from about 0.2% by weight up to about 5% by weight based on the dry solids content thereof of a propylene glycol alginate.

2. The collagen composition of claim 1 wherein said collagen composition contains about 3% by weight of the dry solids content thereof of a propylene glycol alginate.

3. The collagen composition of claim 1 wherein said composition contains at least about 6% by weight collagen solids.

4. The collagen composition of claim 1 wherein said composition contains about 5% to 30% non-collagenous fibers by weight of dry solids content.

5. A collagenous tubular food casing having uniformly incorporated therein at least about 0.1% by weight to about 3.0% by weight of said casing of a propylene glycol alginate.

6. The tubular casing of claim 5 having additionally uniformly incorporated therein from about 3.0 to about 19% by weight of said casing of non-collagenous fibers.

7. The tubular casing of claim 5 having uniformly incorporated therein between about 0.6 and about 1.9% by weight of a propylene glycol alginate.

8. A method of preparing a formable acidic collagen composition suitable for use in preparing a shaped collagen structure including the step of uniformly incorporating into a composition of swollen collagen a propylene glycol alginate in an amount of from about 0.2 to 5% by weight based on the dry solids content of said collagen composition.

9. A method as claimed in claim 8 wherein said collagen composition comprises at least about 6% by weight of collagen solids.

10. A method as claimed in claim 8 wherein about 3% by weight of dry solids of propylene glycol alginate is incorporated in said collagen composition.

11. A method of preparing a formable collagen composition suitable for use in preparing a shaped collagen structure including the steps of:
 (a) preparing a viscous aqueous dispersion of non-collagenous fibers;
 (b) preparing a comminuted acid-swollen collagen mass; and then
 (c) admixing said aqueous fiber-dispersion and a propylene glycol alginate with said acid-swollen collagen mass so that from about 0.2% to about 5% by weight of the propylene glycol alginate based on the solids content of said collagen admixture is incorporated in the collagen composition and then thoroughly mixing until a uniform admixture is obtained.

* * * * *